(12) United States Patent
Nilekar et al.

(10) Patent No.: US 12,413,673 B2
(45) Date of Patent: Sep. 9, 2025

(54) SYSTEMS AND METHODS FOR CALL ROUTING USING GENERIC CALL CONTROL PLATFORMS

(71) Applicant: JPMORGAN CHASE BANK, N.A., New York, NY (US)

(72) Inventors: Rohit Nilekar, Hyderabad (IN); Mohammed Ahamed Mohiseen, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 517 days.

(21) Appl. No.: 17/456,305

(22) Filed: Nov. 23, 2021

(65) Prior Publication Data

US 2022/0166881 A1 May 26, 2022

(30) Foreign Application Priority Data

Nov. 25, 2020 (IN) .............................. 202011051338

(51) Int. Cl.
    *H04M 3/51*     (2006.01)
    *H04M 3/523*    (2006.01)
    *H04M 7/12*     (2006.01)

(52) U.S. Cl.
    CPC ......... *H04M 3/5191* (2013.01); *H04M 3/523* (2013.01); *H04M 7/126* (2013.01); *H04M 7/128* (2013.01)

(58) Field of Classification Search
    CPC .... H04M 3/5191; H04M 3/523; H04M 7/126; H04M 7/128; H04M 7/0021; H04M 3/42323
    See application file for complete search history.

(56) References Cited

U.S. PATENT DOCUMENTS

| | | | | |
|---|---|---|---|---|
| 3,863,990 A * | 2/1975 | Ballard, Jr. | ............ | A24C 5/391 251/63.4 |
| 4,493,027 A * | 1/1985 | Katz | ...................... | G06F 9/4484 712/228 |
| 6,584,490 B1 * | 6/2003 | Schuster | ............... | H04M 3/436 709/200 |
| 6,718,388 B1 * | 4/2004 | Yarborough | ........ | H04L 63/0227 709/227 |

(Continued)

*Primary Examiner* — Lisa Hashem
(74) *Attorney, Agent, or Firm* — GREENBERG TRAURIG LLP (57) ABSTRACT

Systems and methods for call routing using generic call control platforms are disclosed. According to one embodiment, a method for processing a communication request may include: (1) receiving, at a WebSocket layer in a call control platform, a communication request from a web application or a native desktop application; (2) identifying, by the call control platform, a destination infrastructure for the communication request; (3) opening, by the call control platform, a persistent connection with the destination infrastructure; (4) translating, by the call control platform, the communication request into low-level calls for the destination infrastructure; (5) routing, by the call control platform, the low-level calls to the destination infrastructure over the persistent connection; (6) receiving, by the call control platform, an acknowledgement from the destination infrastructure over the persistent connection; and (7) executing, by the call control platform, an action consistent with the communication request.

16 Claims, 6 Drawing Sheets

(56) References Cited

U.S. PATENT DOCUMENTS

| | | | | |
|---|---|---|---|---|
| 8,090,086 B2* | 1/2012 | Chang | ...................... | H04Q 3/64 |
| | | | | 379/88.17 |
| 8,750,474 B2* | 6/2014 | Do | ...................... | H04N 1/0022 |
| | | | | 379/100.01 |
| 9,059,880 B2* | 6/2015 | Laasik | ............... | H04M 3/42042 |
| 9,271,129 B2* | 2/2016 | Lew | ...................... | H04L 51/56 |
| 9,503,529 B2* | 11/2016 | Li | ........................... | H04L 67/02 |
| 9,560,111 B2* | 1/2017 | Li | ........................ | H04W 12/03 |
| 10,193,877 B2* | 1/2019 | Chizhov | .............. | G06F 21/6236 |
| 10,382,402 B2* | 8/2019 | Klaghofer | ............... | H04L 67/02 |
| 10,397,176 B2* | 8/2019 | Yau | ........................ | H04L 67/02 |
| 10,404,758 B2* | 9/2019 | Straub | ................... | H04L 67/289 |
| 10,477,018 B2* | 11/2019 | O'Connor | ........... | H04M 3/5158 |
| 10,581,927 B2* | 3/2020 | Ezell | ................... | H04L 12/1818 |
| 10,880,266 B1* | 12/2020 | Shribman | ........... | H04L 67/2885 |
| 11,095,691 B2* | 8/2021 | Zhang | ................. | H04L 65/1104 |
| 11,228,623 B2* | 1/2022 | Stach | ................. | H04L 65/1069 |
| 11,330,664 B1* | 5/2022 | Martin | ................... | H04W 76/50 |
| 12,041,525 B2* | 7/2024 | Bozik | ................... | H04M 3/5116 |
| 2012/0254407 A1* | 10/2012 | Li | ........................ | H04W 12/03 |
| | | | | 709/224 |
| 2021/0273981 A1* | 9/2021 | Stach | ...................... | H04L 67/02 |
| 2023/0118230 A1* | 4/2023 | Tschetter | ............ | G06F 16/2471 |
| | | | | 707/770 |
| 2025/0055889 A1* | 2/2025 | Bisht | ...................... | H04L 69/22 |

* cited by examiner

SYSTEMS AND METHODS FOR CALL ROUTING USING GENERIC CALL CONTROL PLATFORMS

RELATED APPLICATIONS

This application claims priority to, and the benefit of, Indian Patent Application No. 202011051338, filed Nov. 25, 2020, the disclosure of which is hereby incorporated, by reference, in its entirety.

BACKGROUND OF THE INVENTION

1. Field of the Invention

Embodiments are generally related to systems and methods for call routing using generic call control platforms.

2. Description of the Related Art

Controlling a telephony device from an application is a complex problem, and building it in a generic way and supporting multiple interfaces to communicate with a call control platform makes things even more complex.

SUMMARY OF THE INVENTION

Systems and methods for call routing using generic call control platforms are disclosed. According to one embodiment, a method for processing a communication request may include: (1) receiving, at a WebSocket layer in a call control platform, a communication request from a web application or a native desktop application; (2) identifying, by the call control platform, a destination infrastructure for the communication request; (3) opening, by the call control platform, a persistent connection with the destination infrastructure; (4) translating, by the call control platform, the communication request into low-level calls for the destination infrastructure; (5) routing, by the call control platform, the low-level calls to the destination infrastructure over the persistent connection; (6) receiving, by the call control platform, an acknowledgement from the destination infrastructure over the persistent connection; and (7) executing, by the call control platform, an action consistent with the communication request.

In one embodiment, the communication request may include a registration request, a make call request, an answer call request, or a clear call request.

In one embodiment, the communication request from the web application may be received via REST services.

In one embodiment, the action may include initiating a call, disconnecting the call, answering the call, clearing the call, etc.

In one embodiment, the step of opening the persistent connection with the destination infrastructure may include opening SIP end points with the destination infrastructure.

In one embodiment, the method may further include requesting, by the call control platform, supported telecommunications application (CSTA) features from the destination infrastructure.

In one embodiment, the destination infrastructure may include a telephony server.

According to another embodiment, an electronic device may include a memory storing a call control platform computer program, a computer processor, and a WebSocket layer in communication a web application or a native desktop application. When executed by the computer processor, the call control platform computer program may cause the computer processor to: receive a communication request from the web application or the native desktop application via the WebSocket layer; identify a destination infrastructure for the communication request; open a persistent connection with the destination infrastructure; translate the communication request into low-level calls for the destination infrastructure; route the low-level calls to the destination infrastructure over the persistent connection; receive an acknowledgement from the destination infrastructure over the persistent connection; and execute an action consistent with the communication request.

In one embodiment, the communication request may include a registration request, a make call request, an answer call request, or a clear call request.

In one embodiment, the communication request from the web application may be received via REST services.

In one embodiment, wherein the action may include initiating a call, disconnecting the call, answering the call, or clearing the call.

In one embodiment, the persistent connection may include SIP end points with the destination infrastructure.

In one embodiment, the call control platform computer program may also cause the computer processor to request supported telecommunications application (CSTA) features from the destination infrastructure.

In one embodiment, the destination infrastructure may include a telephony server.

According to another embodiment, a method for processing a communication request may include: (1) receiving, at a call control platform and from a telephony system, a call delivered event; (2) identifying, by the call control platform, a native application for the call delivered event; (3) delivering, by the call control platform, the call delivered event to the native application; (4) receiving, by the call control platform and from the native application, an answer call request; (5) communicating, by the call control platform, the answer call request to the telephony system; (6) receiving, by the call control platform and from the telephony system, an answer call success message; (7) communicating, by the call control platform, the answer call success message to the native application; (8) receiving, by the call control platform, an established event from the telephony system; and (9) communicating, by the call control platform, the established event to the native application.

In one embodiment, the method may further include receiving, by the call control platform and from a web application, a super subscribe request; and subscribing, by the call control platform, the web application.

In one embodiment, the method may further include receiving, by the call control platform and from a web application, a roster request; and subscribing, by the call control platform, the web application.

In one embodiment, the call delivered event may be received at a SIP endpoint for the call control platform.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments are generally related to systems and methods for call routing using generic call control platforms.

In embodiments, the call control platforms may be generic enough to work on cloud/non-cloud platforms and may also support different vendor infrastructures and server clients, such as client apps or running a browser app.

For example, a call control platform may present a WebSocket interface to clients and may use a standard SIP (Session Initiation Protocol) with the infrastructure. The platform may manage the user session, and may convert the SIP messages into, for example, JSON, before sending the messages to client applications for processing. The call control platform may be telephony vendor agnostic and client interface agnostic—in other words, it may support client with native applications on their desktops, or web applications running on the browsers. The client may publish each user's call status to external messaging platforms for the consumers to consume the events and deliver each presence information on the app. User session management may be performed by the call control platform, and also provides the ability to scale horizontally when there is spike in demand.

In embodiments, the call control platform may deliver the call events (e.g., incoming calls or outgoing calls) to the apps in real time for the users to take action and the same should reflect on the user's telephony device.

Embodiments may provide at least some of the following: (1) the ability to support any telephony vendor and any telephony device; (2) the ability to support any client app (native app (e.g., WebSockets) and browser app (e.g., HTTPS)); (3) the ability to deploy as independent component on private/public cloud or physical infrastructure; (4) may support both connection-less and connection-oriented interfaces; (5) may convert SIP messages into standard simplified messages (e.g., JSON messages) and may send the same to client over WebSockets/HTTPS; (6) may publish the call events to external system to delivery real time presence to end user application; (7) may integrate with the telemetry system and logging system to generate metrics and troubleshooting issues.

Figure 1:
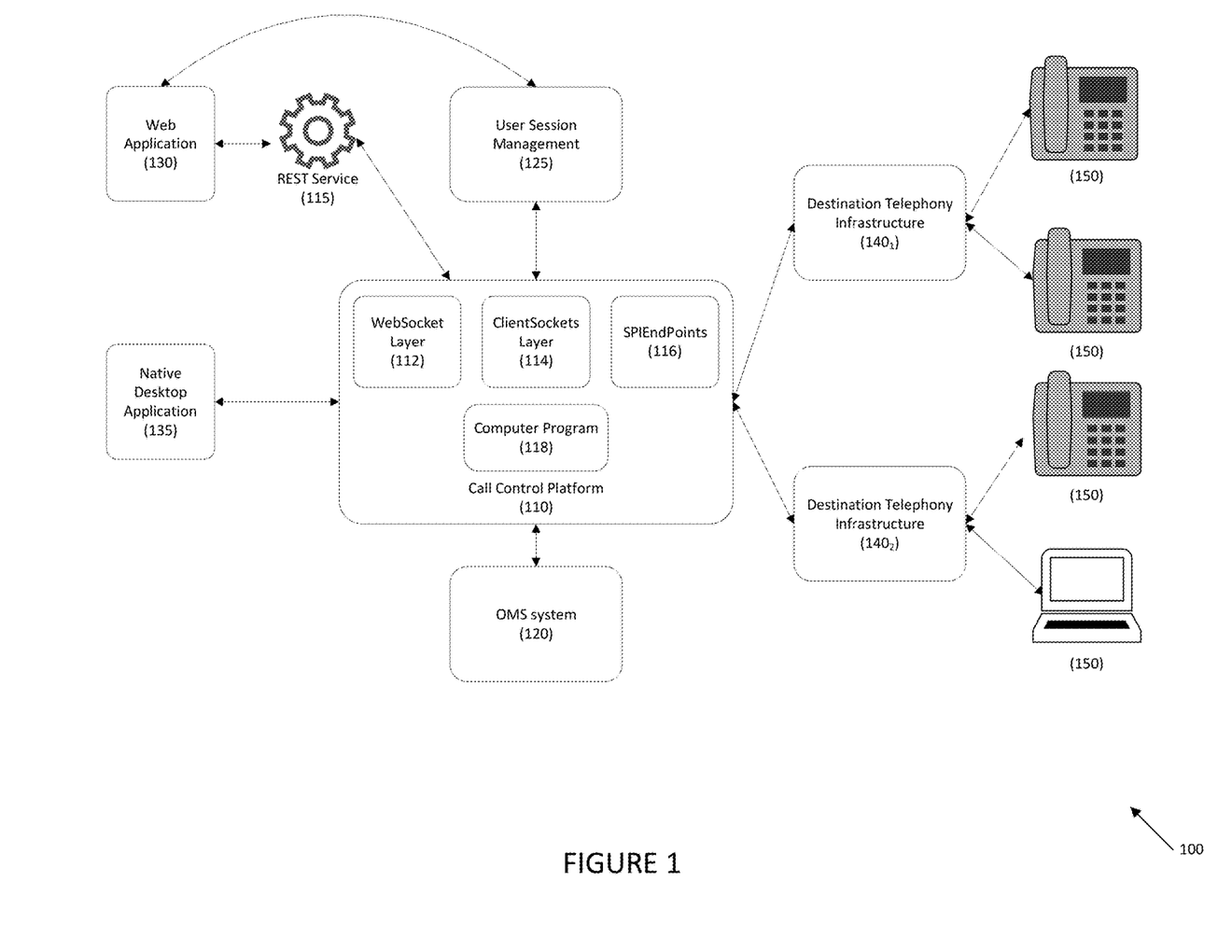
FIG. 1 depicts a system for call routing using generic call control platforms according an embodiment.

Referring to FIG. 1, a system for call routing using generic call control platforms is provided according to an embodiment. System 100 may include clients, such as web application 130 and native desktop application 135. Web application 130 may be run in a browser and may hold contacts for a user.

Web application 130 may further interface with REST services 125, which may communicate with OMS system 120. OMS system 120 may store user details including an associated phone number, a list of devices associated to each end user, session information, telephony system, etc.

User session management program 125 may maintain a mapping to a destination infrastructure, such as destination telephony infrastructure 140$_1$, 140$_2$, etc.

Call control platform 110 may include client sockets 114, which may interface with WebSocket layer 112, Object Management Store (OMS) system 120, and SIPEndPoints 116. SIPEndPoints 116 my interface with telephony infrastructures 140$_1$, 140$_2$, etc., which may be any suitable telephony structure Call control platform 110 may further include computer program 118, which may control the operation of call control platform 110.

In embodiments, call control platform 110 may be provided in the cloud, on a physical server, in combinations, etc.

Web application 130 may interface with call control platform 110 using REST service 115 and WebSocket layer 112, and native desktop application 235 may interface with call control platform 110. Call control platform 110 may interface with user session management 125 and with telephony infrastructures 140$_1$, 140$_2$, etc. in the voice infrastructure.

Telephony infrastructures 140$_1$, 140$_2$, etc. may interface with user devices 150, such as telephones, computer terminals, etc.

Figure 2:
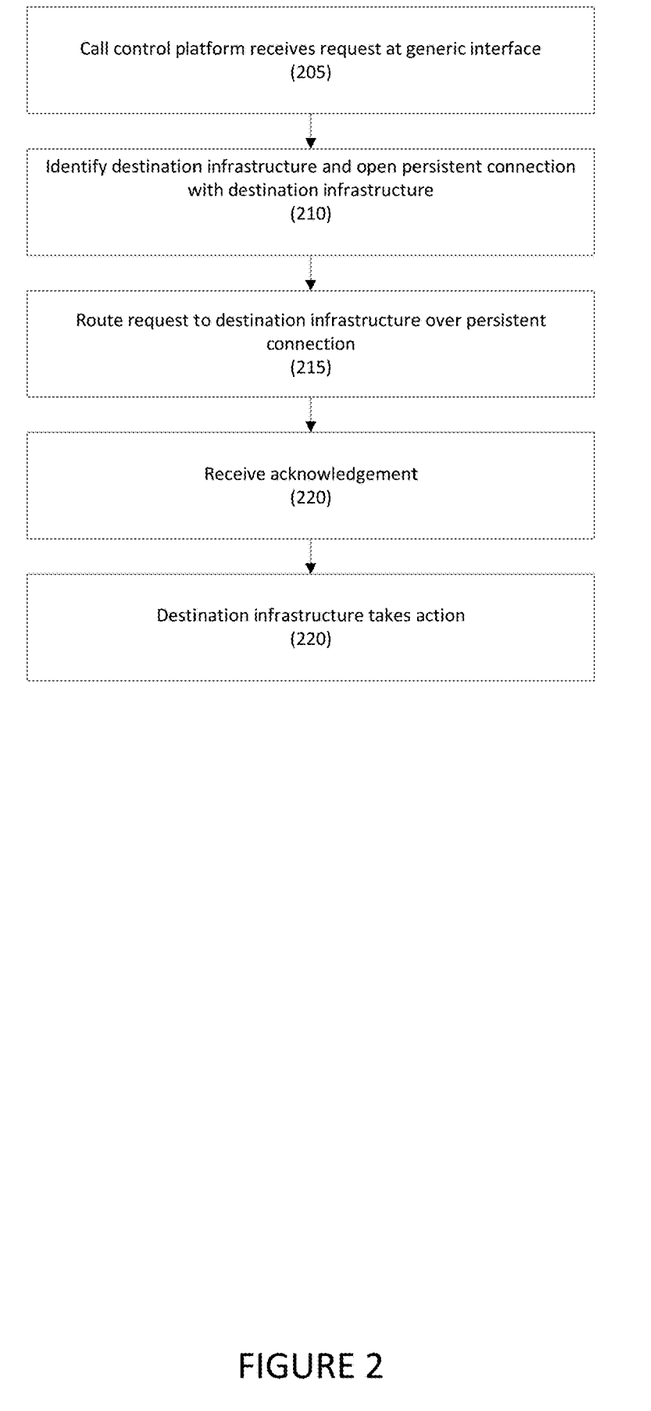
FIG. 2 depicts a method for call routing using generic call control platforms according an embodiment.

Referring to FIG. 2, a method for call routing using generic call control platforms is provided according to an embodiment.

In step 205, a call control platform may receive a communication request from a web application, a native desktop application, etc. The request may be to register, to make a call, to answer a call, to clear a call, etc. Other types of requests may be received as is necessary and/or desired.

For example, a request from a web application may be received at a user session management program which may query whether the requesting user has a server mapping. The web application may then send, via REST services, the request (e.g., a roster request) to the call control platform, and the request may be received at a WebSocket layer.

A communication request from a native desktop application may be received directly by the call control platform. The roster request may be received at a WebSocket layer.

In step 210, the call control platform may identify a destination infrastructure for the communication request and may open a persistent connection with the destination infrastructure. The call control platform may further translate the communication request into the appropriate low-level calls for the destination infrastructure so that the communication request is compatible with a protocol for the destination infrastructure.

In step 215, the call control platform may route the request to the destination infrastructure over the persistent connection.

In step 220, the destination infrastructure may determine whether it can process the request, and if it can, returns an acknowledgement to the call control platform.

In step 225, the destination infrastructure may take an action consistent with the request (initiate call, disconnect call, answer call, etc.).

Figure 3:
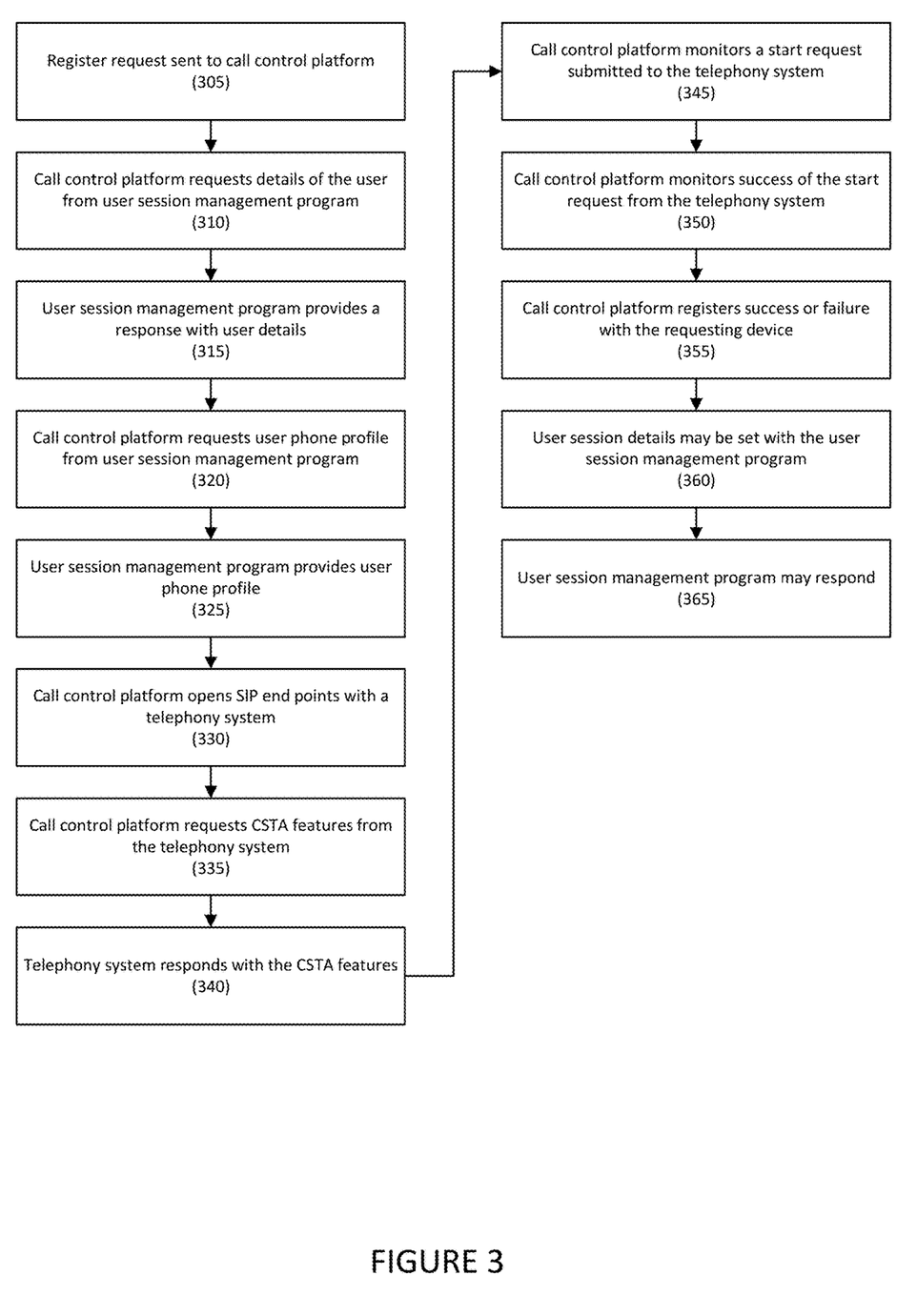
FIG. 3 depicts an exemplary flow for a registration request according to an embodiment.

Referring to FIG. 3, an exemplary flow for a registration request is provided according to an embodiment.

In step 305, a register request may be sent from an application, such as a native desktop application, to a call control platform.

In one embodiment, to process a register request with a web application, the web application may query user session management to see if the user has a server mapping, and, after receiving a response, may submit a request (e.g., a roster request) to the call control platform. The call control platform may return a success or failure message to the web application program.

If the web application has a server mapping, instead of sending a roster request, the web application may submit a subscribe request.

In step 310, the call control platform may request details of the user from a user session management program.

In step 315, the user session management program may provide a response with user details.

In step 320, the call control platform may request the user phone profile from the user session management program.

In step 325, the user session management program may provide a response with the user phone profile. The user profile may identify user devices across multiple platforms that are associated with the end user.

In step 330, the call control platform may open SIP end points with one or more a telephony system, such a telephony systems associated with devices in the user phone profile.

In step 335, the call control platform may submit a request to get computer-supported telecommunications application features, or CSTA features, from the telephony system.

In step 340, the telephony system may respond with the CSTA features.

In step 345, the call control platform may monitor a start request submitted to the telephony system.

In step 350, the call control platform may monitor the success of the start request from the telephony system.

In step 355, the call control platform may register the success or failure of the start request with the native desktop application.

In step 360, user session details may be set with the user session management program, and in step 365, user session management program may respond.

Figure 4:
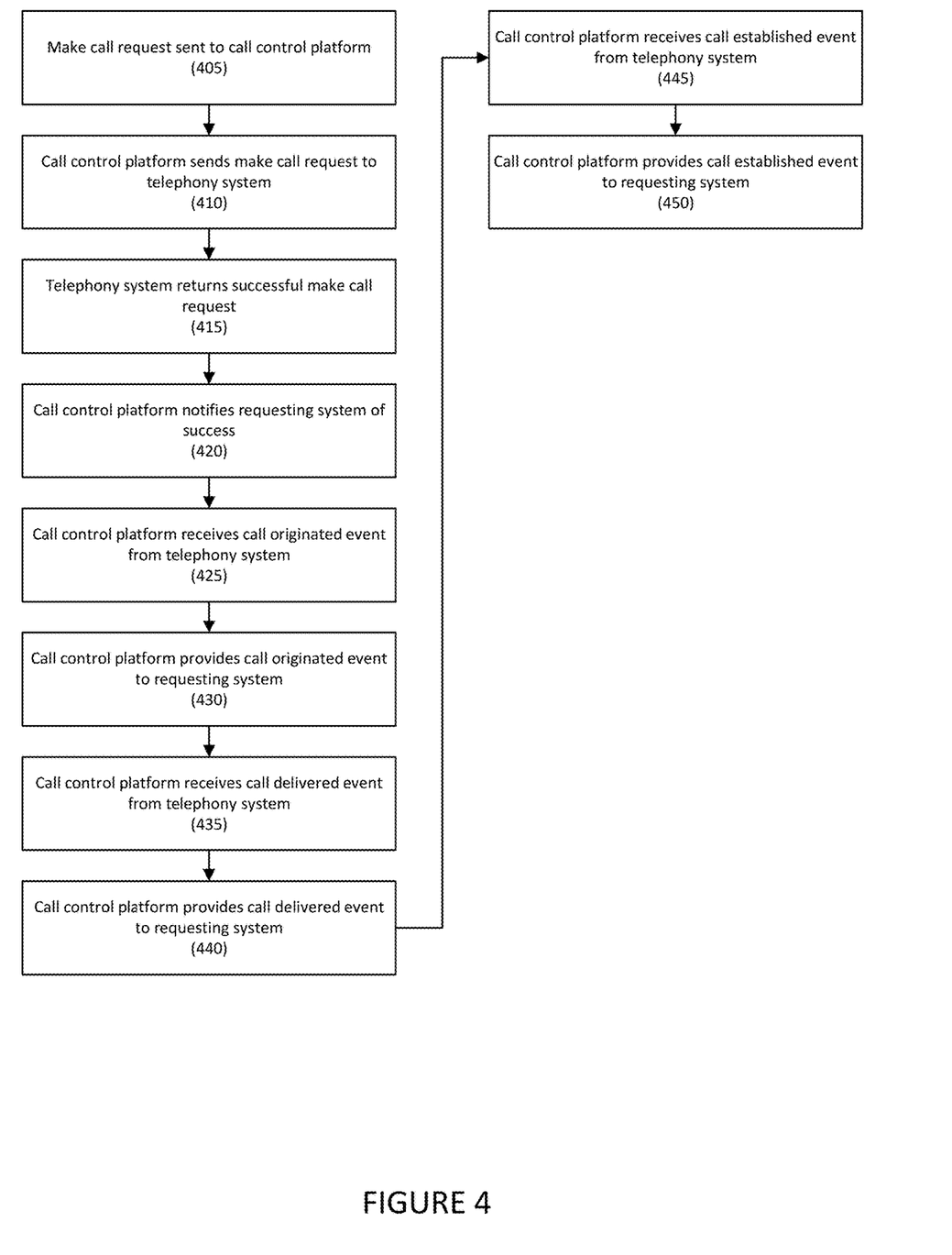
FIG. 4 depicts an exemplary flow for a make call request according to an embodiment.

Referring to FIG. 4, an exemplary flow for a make call request is provided according to an embodiment. In step 405, a make call request may be received from a requesting system, such as a native desktop application. In step 410, the call control platform may submit the make call request to the telephony system.

In one embodiment, a web application may submit a query to user session management to see if the user has a server mapping, and, if a server mapping exists, the web application may submit a super subscribe request to the call control platform. If the mapping does not exist, a request (e.g., a roster request) may be sent to the call control platform.

The web application may further receive a message with the success or failure of the call control message from the call control platform. The call may then be initiated from the physical device that is controlled by the web application.

In step 415, the make call request may be successful, and in step 420, the call control platform provides the success to requesting system.

In step 425, the call control platform may receive a call originated event from the telephony system, and in step 430 may provide this to the native requesting system.

In step 435, the call control platform may receive a call delivered event from the telephony system, and in step 440 may provide this to the native desktop application.

In step 445, the call control platform may receive a call established event from the telephony system, and in step 450 may provide this to the native desktop application.

Figure 5:
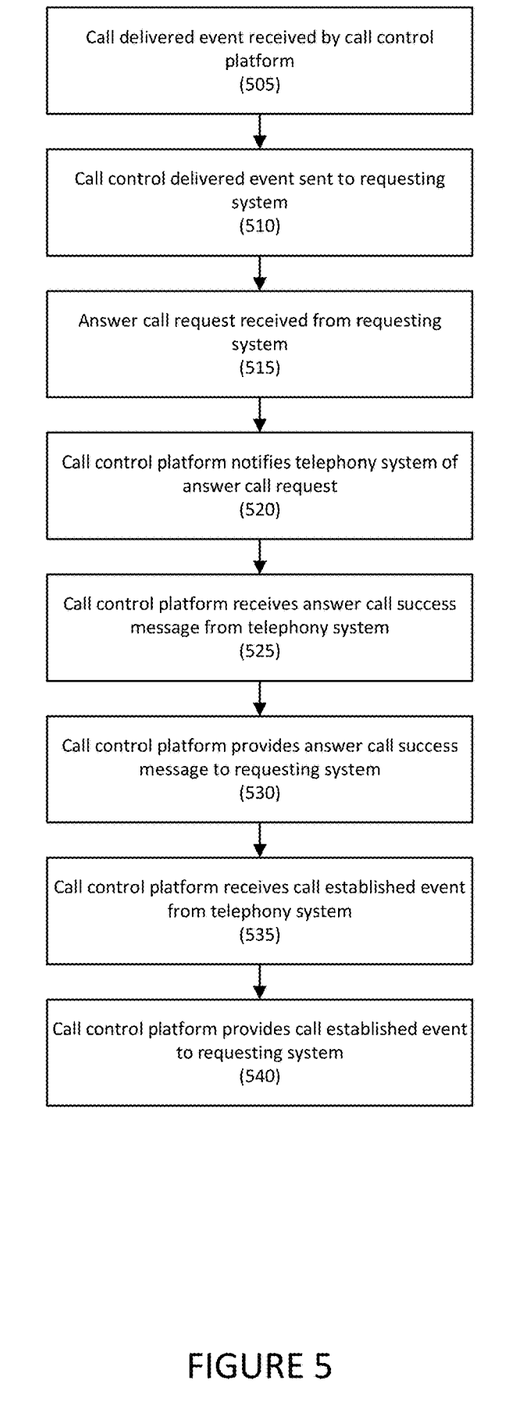
FIG. 5 depicts an exemplary registration flow for processing an answer call request according to an embodiment.

Referring to FIG. 5, an exemplary flow for processing an answer call request is provided according to an embodiment. In step 505, a call delivered event may be received by the call control platform from the telephony system.

In step 510, the call control platform may deliver the call delivered event to the requested system, such as a desktop application or a web application.

In step 515, an answer call request may be received from the requesting system, and in step 520, the answer call request may be provided to the telephony system. For example, the call request may come from the client, and the call control platform may send the request to telephony system as a SIP message.

In step 525, the call control platform may receive an answer call success message from the telephony system, and in step 530, may be provided to the native desktop application.

In step 535, an established event may be received from the telephony system and in step 540, this may be provided to the native desktop application.

Figure 6:
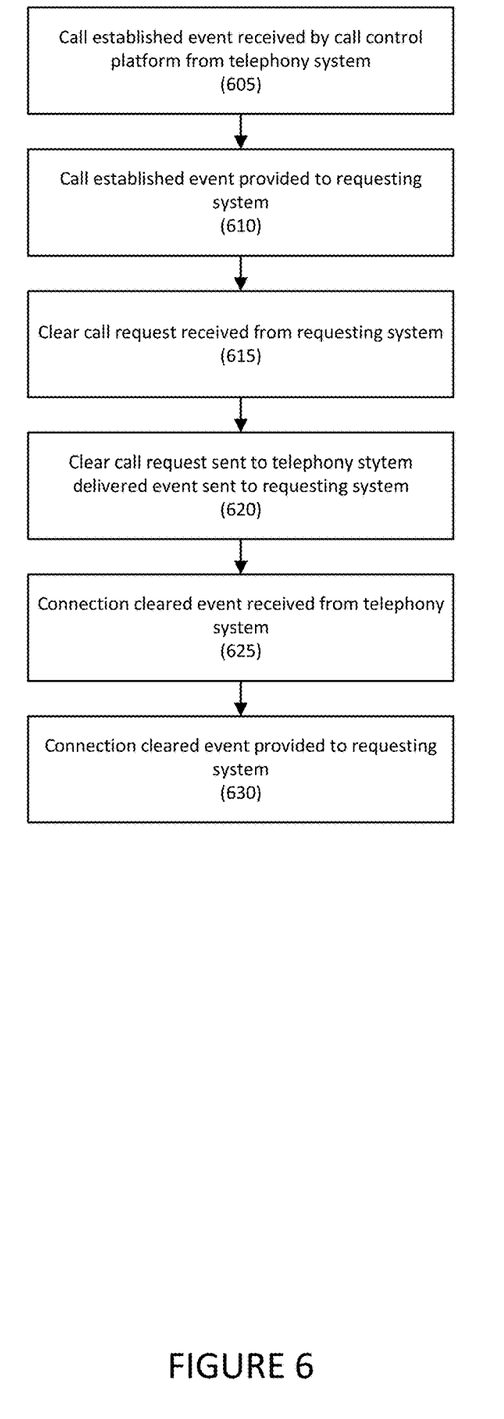
FIG. 6 depicts an exemplary registration flow for processing a clear call request according to an embodiment.

Referring to FIG. 6, an exemplary flow for processing a clear call request is provided according to an embodiment. In step 605, an established event may be received from the telephony system, and, in step 610, this may be provided to the desktop application In step 615, a clear call request may be received from a requesting system, such as a desktop application, and in step 620, the call control platform may route the clear call request to the telephony system.

In step 625, a connection cleared event may be received from the telephony system, and in step 630, may be provided to the requesting system Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

In one embodiment, the processing machine may a cloud-based processing machine, a physical processing machine, or combinations thereof.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for processing a communication request, comprising:
   receiving, at a WebSocket layer in a call control platform, a communication request from a web application via a Representational State Transfer (REST) service that communicates with an OMS system that is configured to store user details;
   identifying, by the call control platform, a destination infrastructure for the communication request which comprises a Session Initiation Protocol (SIP) message;
   storing a user detail associated with the communication request and the destination infrastructure, the user detail including a phone number associated with the destination infrastructure, a list of devices of a user associated with the communication request, or a session information associated with the communication request;
   opening, by the call control platform, a persistent connection with the destination infrastructure;
   translating, by the call control platform, the Session Initiation Protocol (SIP) message into a standard simplified message for the destination infrastructure;
   routing, by the call control platform, the Session Initiation Protocol (SIP) message to the destination infrastructure over the persistent connection;
   receiving, by the call control platform, an acknowledgement from the destination infrastructure over the persistent connection;
   publishing the communication request to the web application; and
   executing, by the call control platform, an action consistent with the communication request.

2. The method of claim 1, wherein the communication request comprises a clear call request.

3. The method of claim 1, wherein the action comprises clearing the call.

4. The method of claim 1, wherein the step of opening the persistent connection with the destination infrastructure comprises opening Session Initiation Protocol (SIP) end points with the destination infrastructure.

5. The method of claim 1, further comprising:
   monitoring a start request submitted by the destination infrastructure;
   monitoring a result of the start request;
   registering the result of the start request.

6. The method of claim 1, wherein the destination infrastructure comprises a computer terminal.

7. An electronic device, comprising:
   a memory storing a call control platform computer program;
   a computer processor; and
   a WebSocket layer in communication with a web application or a native desktop application;
   wherein when executed by the computer processor, the call control platform computer program causes the computer processor to:
   receive a communication request comprising a Session Initiation Protocol (SIP) message from the web application via the WebSocket layer and a Representational State Transfer (REST) service;
   identify a destination infrastructure for the communication request;
   storing a user detail associated with the communication request and the destination infrastructure, the user detail including a phone number associated with the destination infrastructure, a list of devices of a user associated with the communication request, or a session information associated with the communication request;
   open a persistent connection with the destination infrastructure;
   translate the communication request into a standard simplified message for the destination infrastructure;
   route the communication request to the destination infrastructure over the persistent connection;
   receive an acknowledgement from the destination infrastructure over the persistent connection;
   publishing the communication request to the web application; and
   execute an action consistent with the communication request.

8. The electronic device of claim 7, wherein the communication request comprises a clear call request.

9. The electronic device of claim 7, wherein the action comprises clearing the call.

10. The electronic device of claim 7, wherein the persistent connection comprises opening Session Initiation Protocol (SIP) end points with the destination infrastructure.

11. The electronic device of claim 7, wherein the call control platform computer program further causes the computer processor to request computer-supported telecommunications application (CSTA) features from the destination infrastructure.

12. The electronic device of claim 7, wherein the destination infrastructure comprises a computer terminal.

13. A method for processing a communication request, comprising:
receiving, at a WebSocket layer in a call control platform and from a telephony system, a call delivered event via a Representational State Transfer (REST) service;
storing a user detail associated with the call delivered event and the telephony system, the user detail including a phone number associated with the telephony system, a list of devices of a user associated with the communication request, or a session information associated with the call delivered event;
identifying, by the call control platform, a native desktop application for the call delivered event which comprises a Session Initiation Protocol (SIP) message;
translating, by the call control platform, the Session Initiation Protocol (SIP) message into a standard simplified message for the call delivered event;
delivering, by the call control platform, the call delivered event to the native desktop application;
receiving, by the call control platform and from the native desktop application, an answer call request;
communicating, by the call control platform, the answer call request to the telephony system;
receiving, by the call control platform and from the telephony system, an answer call success message;
communicating, by the call control platform, the answer call success message to the native desktop application;
receiving, by the call control platform, an established event from the telephony system;
publishing the communication request to the native desktop application; and
communicating, by the call control platform, the established event to the native desktop application.

14. The method of claim 13, further comprising:
receiving, by the call control platform and from a web application, a super subscribe request; and
subscribing, by the call control platform, the web application.

15. The method of claim 13, further comprising:
generating, by the call control platform, a roster request if a query to a user session management does not return a server mapping based on the user detail; and
subscribing, by the call control platform, the web application.

16. The method of claim 13, wherein the call delivered event is received at a Session Initiation Protocol (SIP) endpoint for the call control platform.

* * * * *